(12) United States Patent
Gallay et al.

(10) Patent No.: US 6,952,338 B1
(45) Date of Patent: Oct. 4, 2005

(54) COMMON POLE CAPACITOR HOUSING APPARATUS AND METHOD

(75) Inventors: Roland Gallay, Farvagny-le-Petit (CH); Daniel Schlunke, Châtonnaye (CH)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 10/889,205

(22) Filed: Jul. 12, 2004

Related U.S. Application Data

(60) Provisional application No. 60/518,421, filed on Nov. 7, 2003.

(51) Int. Cl.$^7$ .............................. H01G 9/00; H01G 4/32
(52) U.S. Cl. .................. 361/502; 361/511; 361/517; 361/522; 361/541
(58) Field of Search .................. 361/502, 511–512, 361/515, 517–522, 530, 535–541, 301.5, 361/328–330; 429/163, 164, 153, 154

(56) References Cited

U.S. PATENT DOCUMENTS

| | | | | |
|---|---|---|---|---|
| 3,275,902 A | * | 9/1966 | McHugh et al. | 361/518 |
| 4,992,910 A | * | 2/1991 | Evans | 361/502 |
| 5,260,855 A | * | 11/1993 | Kaschmitter et al. | 361/502 |
| 5,786,980 A | * | 7/1998 | Evans | 361/502 |
| 5,850,331 A | * | 12/1998 | Matsumoto et al. | 361/502 |
| 6,238,818 B1 | * | 5/2001 | Dalton | 429/96 |
| 6,298,046 B1 | * | 10/2001 | Thiele | 370/282 |
| 6,310,756 B1 | * | 10/2001 | Miura et al. | 361/301.3 |
| 6,327,137 B1 | * | 12/2001 | Yamamoto et al. | 361/517 |
| 2002/0012223 A1 | * | 1/2002 | Okamura et al. | 361/502 |

* cited by examiner

*Primary Examiner*—Eric W. Thomas
(74) *Attorney, Agent, or Firm*—Gregory J. Koerner; Redwood Patent Law; Mark A. Wardas

(57) ABSTRACT

A housing is provided for connecting two capacitor cells in a series or parallel combination and for providing the two cells as one integral product.

11 Claims, 7 Drawing Sheets

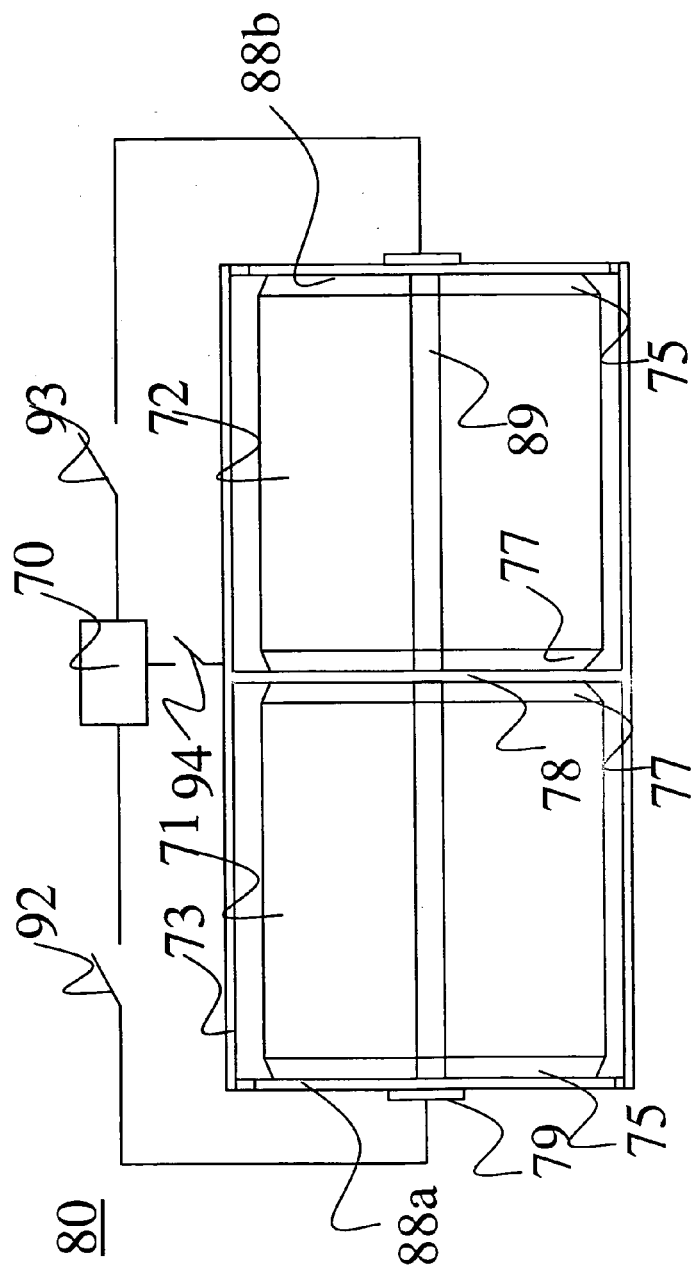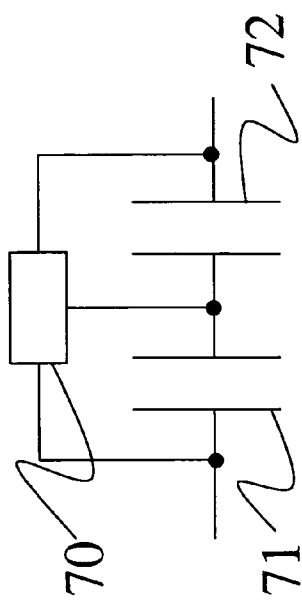
Fig. 5a
Fig. 5b

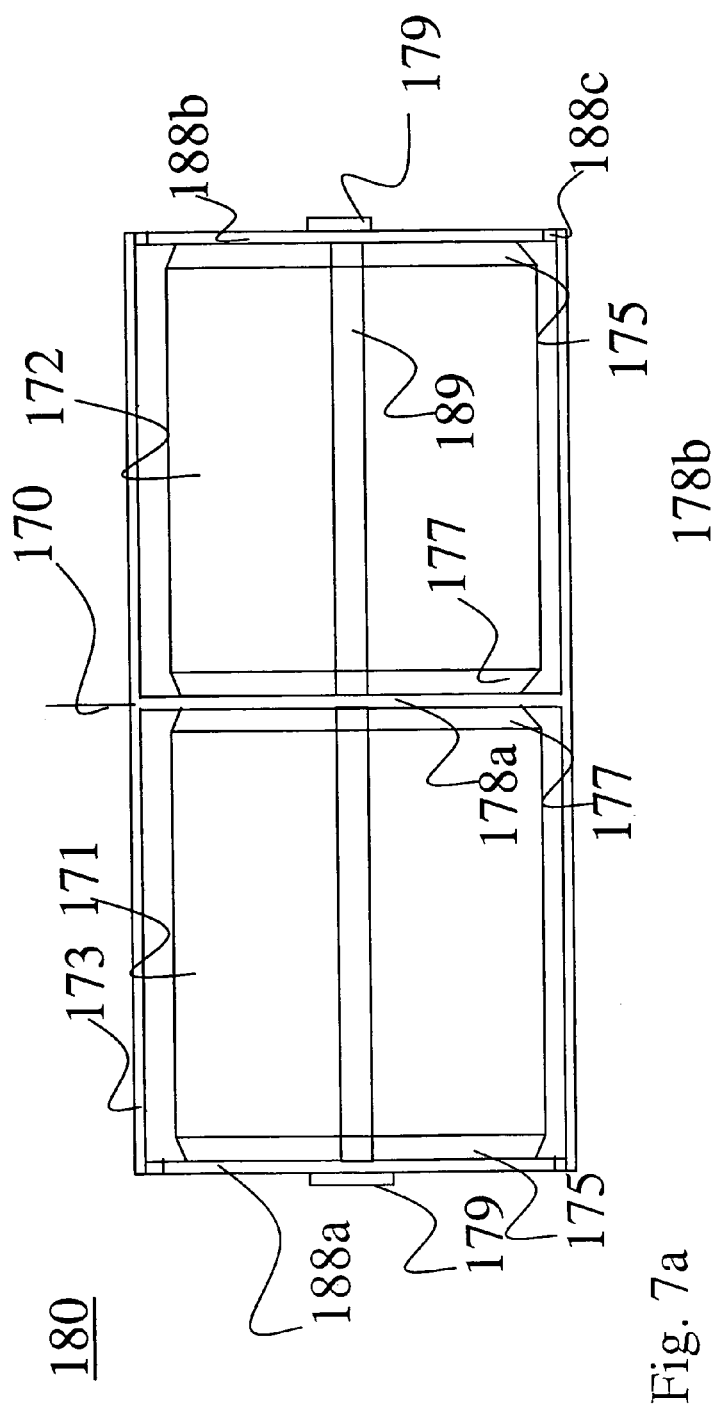
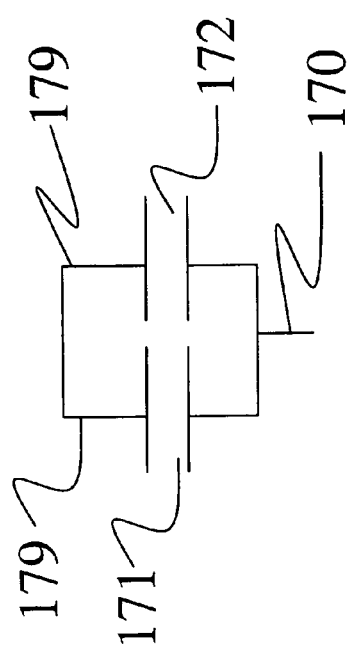
Fig. 7a
Fig. 7b

COMMON POLE CAPACITOR HOUSING APPARATUS AND METHOD

RELATED APPLICATIONS

This Application is related to and claims priority from commonly assigned U.S. Provisional Application 60/518,421, filed 7 Nov. 2003.

BACKGROUND

High capacity double-layer capacitor cells (also known as super-capacitors and ultra-capacitors) are rated for operation at low voltages. The operating cell voltages of double-layer capacitor cells are typically no more than about 4 volts and nominally about 2.7 volts. Charge storage devices are often used in combination to provide higher energy delivery and/or higher capacitance. To provide such higher energy delivery and/or higher capacitance, one or more interconnection typically needs to be made. It would be desirable that such interconnections be as simple and reliable as possible.

SUMMARY

In one embodiment, an energy storage device packaging system comprises a housing, the housing having a body and a separator, the body having a first opening and a second opening, the separator disposed within the housing, and the first and second opening separated by the separator; a first energy storage device cell, disposed within the body and coupled to a first side of the separator; and a second energy storage device cell disposed within the body and coupled to a second side of the separator. In one embodiment, the first cell and the second cell are double-layer capacitors. In one embodiment, the first cell and the second cell each have a maximum operating voltage of about 4 volts. In one embodiment, the housing comprises a battery sized form factor. In one embodiment, the separator is in conductive contact with the housing. In one embodiment, the first and second cell are connected in series. In one embodiment, the first and second cell are connected in parallel. In one embodiment, the cells and the housing are coupled to a balancing circuit.

In one embodiment, a double-layer capacitor product comprises a housing, the housing having a body and a separator, the body having a first opening and a second opening, the separator disposed within the housing, and the first and second opening separated by the separator; a first double-layer capacitor cell, disposed within the body and coupled to a first side of the separator; and a second double-layer capacitor cell disposed within the body and coupled to a second side of the separator. In one embodiment, the product is rated to operate above 4 volts. In one embodiment, the housing and the separator are in conductive contact.

In one embodiment, a capacitor product comprises a first jellyroll type capacitor cell, the cell comprising at least one collector; and a second jellyroll type capacitor cell, cell comprising at least one collector, wherein the at least one collector of the first cell is electrically coupled to the at least one collector of the second cell by a welded connection.

In one embodiment, a method of manufacturing a capacitor comprise the steps of: providing a first and a second capacitor cell; providing a capacitor housing; inserting the first capacitor cell into the housing; and inserting the second capacitor into the capacitor housing. The method may further include a step of electrically attaching the first and second capacitor together. The step of electrically attaching may comprise attaching the first and second capacitor to a sealing portion. The sealing portion may be disposed within the housing. The capacitors may comprise double-layer capacitors. The housing may comprise a double open-ended housing. The housing may comprise a battery sized form factor. The first and second cell may each comprise a jellyroll type structure, wherein the two jellyroll structures are connected together in one connection step.

In one embodiment, a method of manufacturing a capacitor may comprise the steps of: providing a first and a second capacitor cell; providing a housing; and connecting the first capacitor cell and the second capacitor cell to the housing in one connecting step. The coupling step may comprise a welding step. The coupling step may comprise a soldering step. The coupling step may comprise a brazing step. The coupling step may comprise a gluing step. The connecting step may comprise connecting to a conductive separator disposed within the housing.

In one embodiment, a method of manufacturing a capacitor comprises the steps of: providing a first and a second capacitor cell; providing a capacitor housing; coupling the first capacitor cell to the second capacitor cell; inserting the first capacitor cell and the second capacitor cell into the housing. The coupling step may comprise coupling two jellyroll type capacitor cells together. The two jellyroll type capacitors cells may be coupled to a conductive separator.

These and other features and aspects of the present invention will be better understood with reference to the following description, figures, and appended claims.

FIGURES

FIG. 5a illustrates a charge balancing circuit used with two series connected capacitor cells connected in series within a housing, and FIG. 5b illustrates in schematic form the electrical circuit formed thereby;

FIG. 7a illustrates a side cross-sectional view of a capacitor housing used for holding two capacitor cells used in a parallel configuration and, FIG. 7b illustrates in schematic form the electrical circuit formed thereby.

DESCRIPTION

Figure 1:
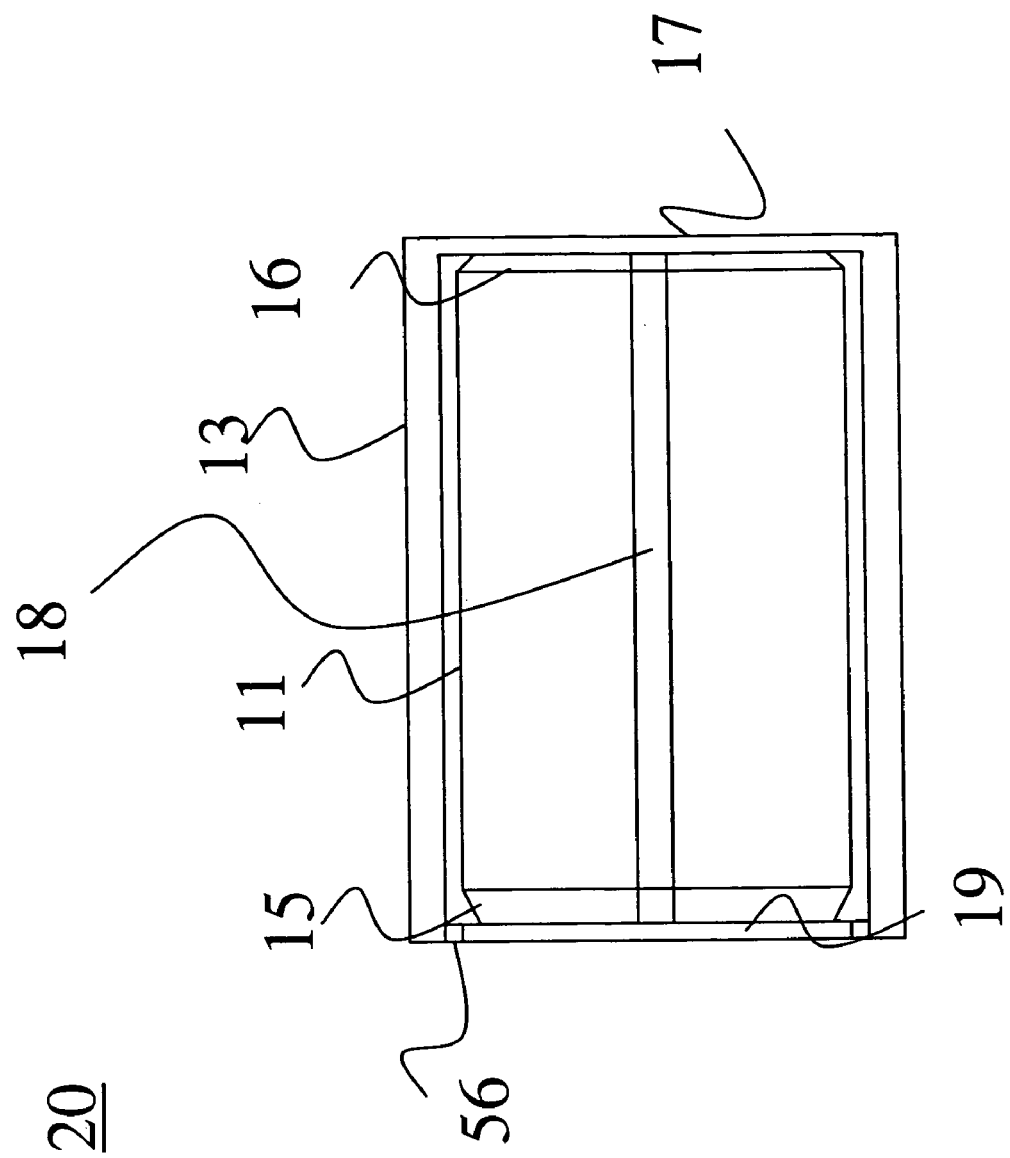
FIG. 1 illustrates a cross-sectional view of a capacitor cell positioned within a capacitor housing.

FIG. 1 illustrates a cross-sectional view of a capacitor cell positioned within a capacitor housing. In one embodiment, a capacitor cell 11 comprises collectors and electrodes disposed on either side of the collectors. The capacitor cell 11 in FIG. 1 is formed in a configuration known to those skilled in the art as a "jellyroll", where offset collectors, electrodes, and separators are rolled to form the jellyroll. In one embodiment, the jellyroll is formed about a support rod. In a jellyroll configuration, longitudinal edges of the offset collectors 15, 16 extend from the jellyroll in opposing directions. In one embodiment, after rolling, the support rod is removed from the jellyroll to leave a centrally disposed void 18. In one embodiment, capacitor cell 11 is positioned within a housing 13, for example, a can, a tube, or a cylinder open at one end and sealed or closed at another end. The capacitor cell 11 is positioned such that edges of a collector 16 extending from one end of the jellyroll butt up against a sealed or closed end or bottom 17 of the housing 13. In one embodiment, a resistive contact and connection between the collector 16 and the bottom 17 may be improved by soldering, welding, or otherwise attaching the collector 16 to the bottom 17. In one embodiment, one end of a spot welder is positioned through the void 18 at or near the bottom 17, and the edges of collector 16 are subsequently welded to the bottom 17. In one embodiment, edges of collector 15 at an opposite end of the rolled capacitor 11 are attached to a sealing cap 19. In one embodiment, the collector 15 is attached to sealing cap 19 by welding. In other embodiments, collectors 15, 16 may be attached by many other different techniques known to those skilled in the art, for example: laser welding, conductive glues, soldering, mechanical attachment, brazing, to name a few. In one embodiment, sealing cap 19 is attached to the housing 13 with an insulating seal 56 disposed therebetween. The sealed housing 13 is subsequently impregnated with an electrolyte through a fill hole (not shown). In one embodiment, the insulating seal 56 provides electrically insulates the sealing cap 19 from housing 13 as well as prevents the electrolyte from escaping from within the sealed housing.

Figure 2:
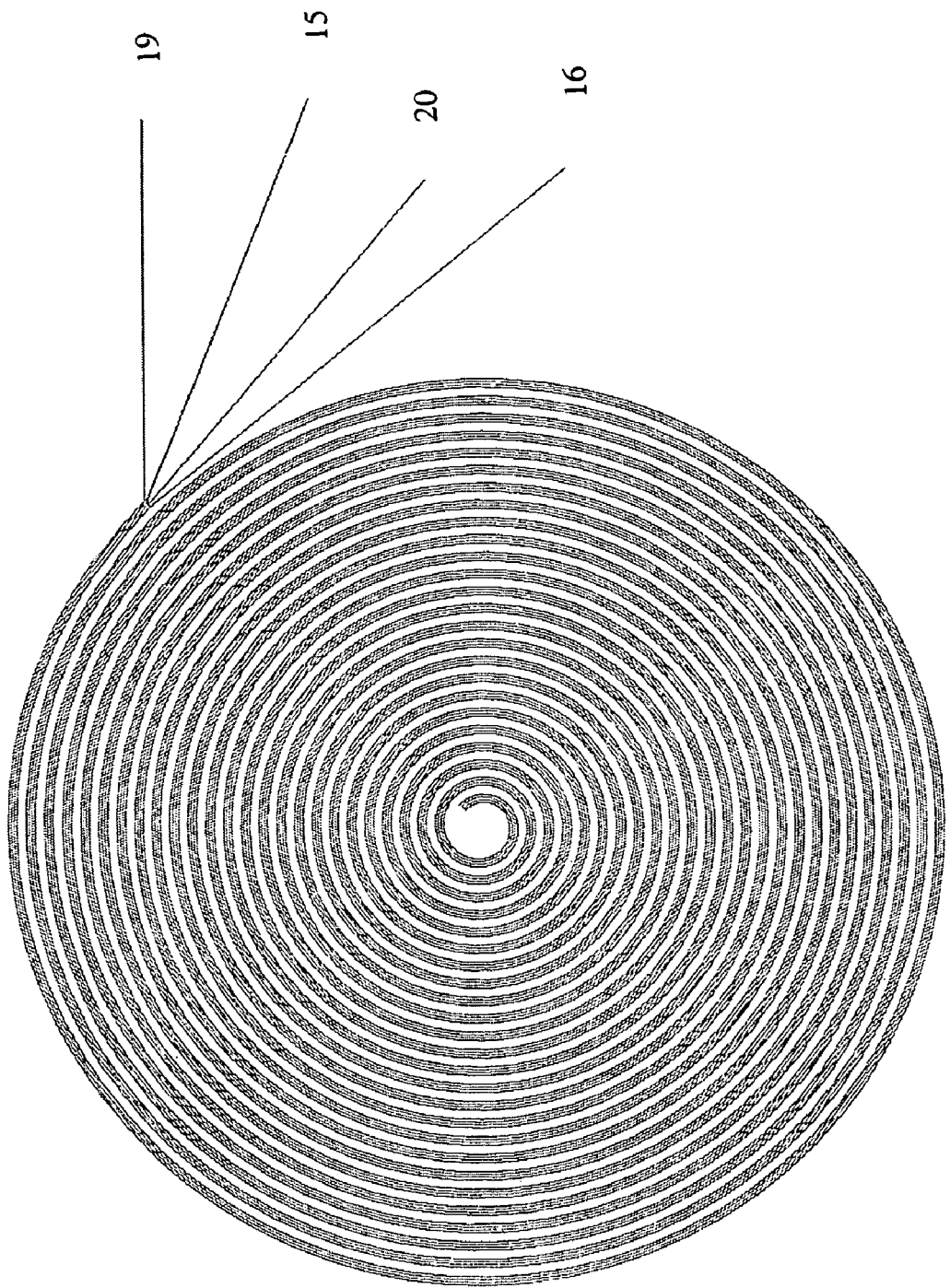
FIG. 2 illustrates a top cross-section of a jellyroll configured capacitor cell.

FIG. 2 illustrates a cross-section of a jellyroll configured capacitor cell. As viewed from an end in a cross-section, in one embodiment, a capacitor cell 11 comprises two collectors 15, 16. Each collector 15, 16 is offset in a perpendicular direction to that of the crossection such that edges of one collector extend in one direction and such that edges of the other collector extend on the opposite direction. The collectors 15, 16 each have disposed on each of their sides an electrode film (not shown). The collectors and electrode film combinations are separated by separators 19, 20, the combination of which is rolled to form a jellyroll type capacitor cell 11.

Figure 3:
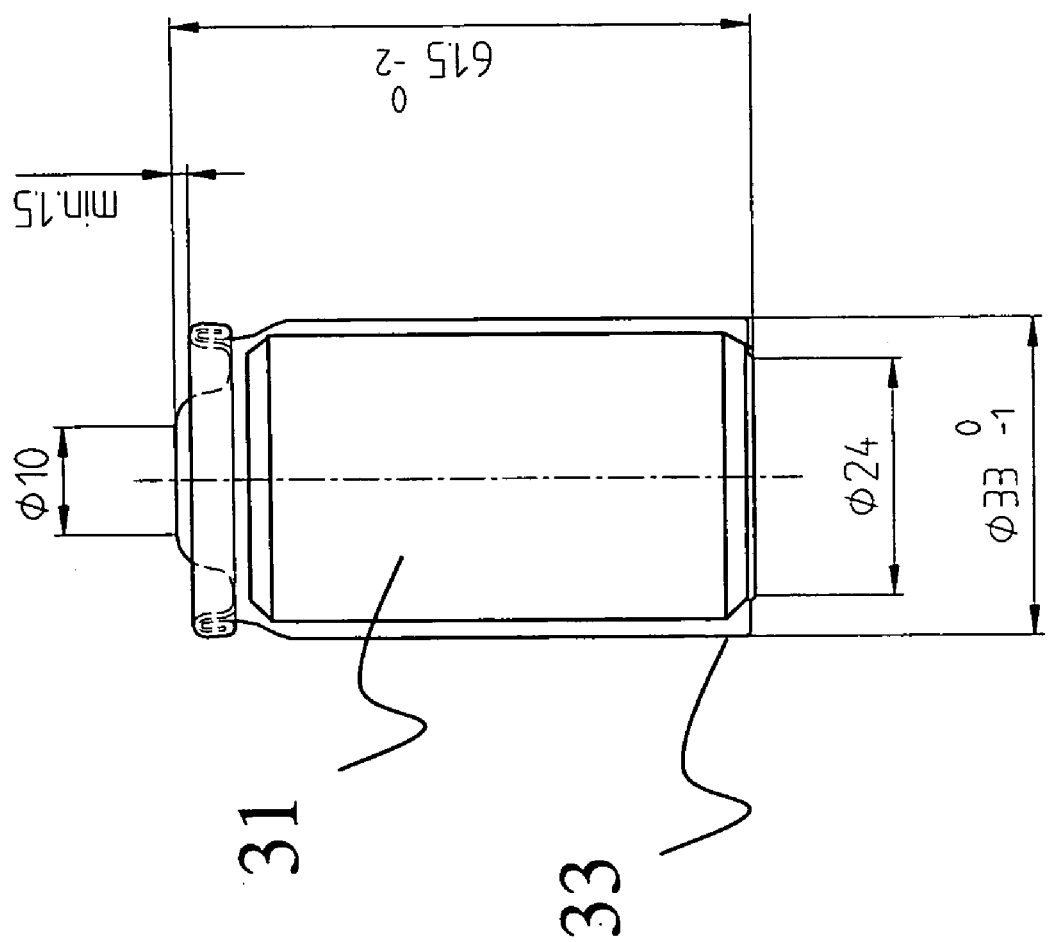
FIG. 3 illustrates a cross-sectional view of a battery form factor sized capacitor.

FIG. 3 illustrates a cross-sectional view of a battery form factor sized capacitor. In one embodiment, a jellyroll configured capacitor cell 31 is disposed and impregnated within housing 33 to provide a finished capacitor product 30 that conforms to the dimensions of a D sized battery form factor. Various battery form factor sized capacitors are disclosed in commonly assigned U.S. patent application Ser. No. 10/766,727, filed 27 Jan. 2004, which is incorporated herein by reference.

Because a capacitor cell 31 comprised of double-layer capacitor technology is limited by its physics and chemistry to a maximum operating voltage of about 4 volts, a single double-layer capacitor product provided in a housing, for example, a battery form factor sized housing 33, would also be limited to a maximum operating voltage of about 4 volts. Furthermore, because the nominal operating voltage of double-layer capacitor cells is typically about 2.7 volts, the nominal operating voltage of a single cell double layer capacitor product 30 provided in a battery form factor sized housing 33 would also be about 2.7 volts. In one embodiment, a jellyroll double-layer capacitor cell disposed within a housing 33 can provide about 500 Farads of capacitance at about 2.7 volts.

Figure 4A:
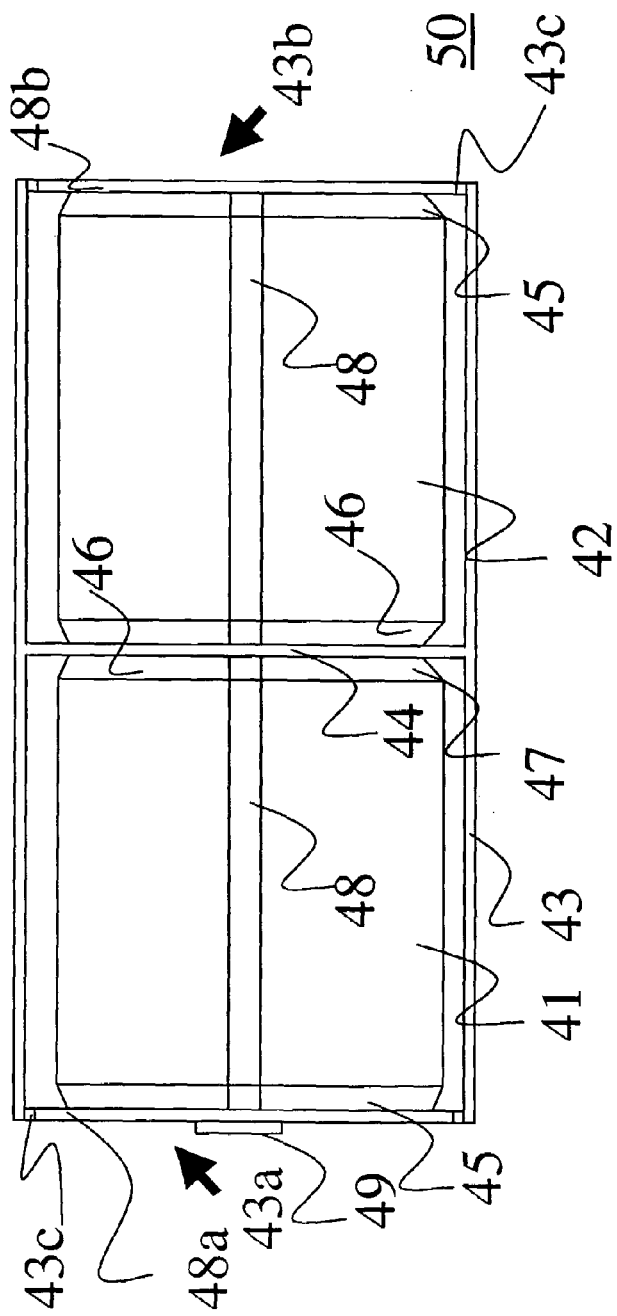
FIG. 4a illustrates a side cross-sectional view of a capacitor housing used for holding two series connected capacitor cells.
Figure 4B:
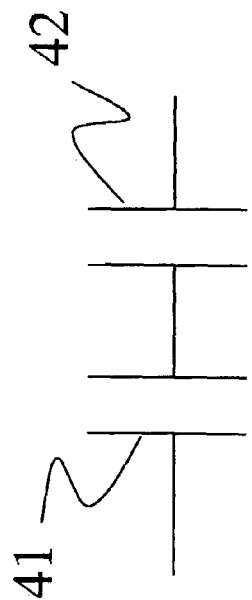
FIG. 4b illustrates in schematic form the electrical circuit formed thereby.

FIGS. 4a illustrates a side cross-sectional view of a capacitor housing used for holding two capacitor cells, and FIG. 4b illustrates in schematic form the electrical circuit formed thereby. In one embodiment, as viewed from each end, a capacitor housing 43 comprises an open-ended cylinder or tube that defines a double open-ended housing. In other embodiments, housing 43 may comprise, as viewed from an end, an elongated, rectangular, square, rectangular, or other geometry. In one embodiment, housing 43 comprises opposing open ends 43a, 43b. In one embodiment, the housing 43 comprises a centrally disposed inner sealing portion 44. Portion 44 effectuates a sealed inner separation of the housing 43, such that the housing can be used to functionally separate two capacitor cells 41, 42 disposed therein. In one embodiment, the housing 43 and the sealing portion 44 comprise a conductor or the like, for example, a metal such as aluminum. When in contact, it is understood that the conductive housing 43 and a conductive sealing portion 44 may be electrically connected. The housing 43 and/or portion 44 can be manufactured by one or more techniques known to those skilled in the art, for example, by molding, by extrusion, by deep draw, by physical insertion of the sealing portion, by coupling two single open-ended housings together at their closed ends, etc. In one embodiment, wherein two single open-ended housings are coupled together at their closed end, the sealing portion 44 would comprise the combination of the two closed ends. Those skilled in the art will, thus, understand that the structure comprised of housing 43 and portion 44 could be formed as one integral piece, or as two or more separate connected pieces. In one embodiment, capacitor cells 41, 42 comprise double-layer capacitor cells configured as jellyrolls, wherein edges of collectors 45, 46 extend from ends of the capacitors. In one embodiment, a first capacitor cell 41 and a second capacitor cell 42 are each formed by rolling offset collectors, electrodes disposed on the collectors, and separators separating the electrodes, about a support rod. In one embodiment, the support is removed after rolling, leaving respective voids 48 in the capacitor cells 41, 42. In one embodiment, the first capacitor cell 41 is disposed into one open end 43a of the housing 43, and the second capacitor cell 42 is disposed into a second open end 43b of the housing 43, such that the inward edges of collectors 46 extending from respective ends of the first and the second capacitor cells 41, 42 electrically contact a respective opposing side or surface of the sealing portion 44.

Contact between collectors 46 and sealing portion 44 can be improved by connecting the edges of collectors 46 to a respective side or surface of sealing portion 44. In one embodiment, the housing 43 comprises sealing caps 48a, 48b. In one embodiment, the outward edges of collectors 45 of capacitor cells 41 and 42 are connected to respective sealing caps 48a, 48b. In one embodiment, improved connection of inner edges of collectors 46 may be effectuated by a welder placed in a void 48 of a respective capacitor cell 41, 42 at or near the inner edges of the collectors that butt up against the sealing portion 44. In one embodiment, the welder may be placed in each void 48 of each capacitor cell 41, 42 at or near the collectors 46, and the collectors 46 of both cells may be welded to the separator in one connection step.

It is identified that connection of two capacitor cells together within housing 43 in one process step enables improved process efficiencies that lower manufacturing cost. It is understood, that although edges of collectors 45 and/or 46 may be electrically contacted to a respective sealing portion 44 and sealing caps 48a or 48b using techniques known generically as welding, the use of this term is not meant to be limiting as other techniques for accomplishing low resistance connections can also be used, for example, spot welding, laser welding, conductive gluing, brazing, mechanical attachment, to name a few. In one embodiment, one or both of the sealing caps 48a, 48b may be attached to the housing 43 at respective open ends 43a, 43b, where electrically non-conductive seals 43c are disposed between the sealing caps and the housing 43. In one embodiment, one or both sealing caps 48a–b may include a connecting electrode 49 or terminal of a configuration appropriate for effectuating external connection to the sealing caps.

FIG. 5a illustrates a charge balancing circuit used with two series connected capacitor cells and a housing, and FIG. 5b illustrates in schematic form the electrical circuit formed thereby. It is identified that two or more capacitor cells connected in series may be operated at a higher voltage than one capacitor cell alone. Thus, two or more series connected double-layer capacitor cells could be operated at voltages above the about 4 volt limitation of a single capacitor cell, for example, up to about 8 v (twice the rating of one cell), allowing a series combination of double-layer capacitors to be used in a wider range of applications than a single double-layer capacitor cell. In an application wherein two double-layer capacitor cells rated for a nominal operating voltage of about 2.7 volts are connected in series, those skilled in the art would identify that that a nominal operating voltage the series combination could be used at about 5.4 volts, a voltage at which many more circuits and devices are know to operate and higher than that available from one double-layer capacitor cell. Accordingly, it is identified that a double open-ended capacitor housing as described herein may be used to facilitate series connection of two double-layer capacitor cells and, thus, to provide such a series combination of cells in applications requiring higher voltages than about 2.7 volts. Furthermore, it is identified that a double open-ended housing could be provided in a battery form factor sized housing, for example, as a D cell form factor sized housing, with each capacitor cell within the housing sized appropriately to fit within the housing.

It is identified that in some applications, for example, when two double-layer capacitor cells are connected in series, the application may require that the voltage V applied across the capacitors be equally distributed. A balancing circuit 70 is now capable of being manufactured very cheaply (on the order of cents) and in a very small form factor, for example as an ASIC, an encapsulated semiconductor die, or the like, thus allowing it to be used unobtrusively in many applications. One or more embodiment of a charge balancing circuit 70 is described in commonly assigned U.S. application Ser. No. 10/423,708, which is incorporated herein by reference.

In one embodiment, a charge balancing circuit 70 is coupled to two series connected capacitor cells 71, 72, and the cells are disposed within a double open-ended capacitor housing 73. In one embodiment, the housing 73 comprises a sealing portion 78. In one embodiment, the edges of inner collectors 77 of capacitor cells 71, 72 are electrically coupled by sealing portion 78 to form a series connection thereby. In one embodiment, the capacitor cells 71, 72 are coupled to portion 78 after sealing portion is formed within or inserted into housing 73. In one embodiment, the capacitor cells 71, 72 are coupled to sealing portion 78 before the portion is inserted into housing 73. In one embodiment, the capacitor cells 71, 72 may be coupled to sealing portion 78 outside of the housing 33, and subsequently inserted within the housing 33. It is identified that connection of two jellyroll capacitor cells together at a sealing portion in one process step enables improved process efficiencies that lower manufacturing cost. In one embodiment, edges of inner collectors 77 are connected to portion 78 by a conductive glue, spot welding, laser welding, soldering, brazing, mechanical attachment, or other similar connection means. In one embodiment, housing 73 comprises sealing caps 88a, 88b. In one embodiment, edges of outer collectors 75 can also be coupled to respective sealing caps 88a, 88b using one or more techniques described herein previously, for example, by spot welding, conductive glues, laser welding, brazing, soldering, etc. In one embodiment, both sealing caps 88a, 88b may be coupled to housing 73 by an insulating seal 88c disposed therebetween.

In one embodiment, ends of the charge balancing circuit 70 may be electrically coupled to the sealing caps 88a, 88b. In one embodiment, charge balancing circuit 70 is coupled electrically to outer collectors 75 through the connection of sealing caps 88a, 88b thereto, and is coupled to inner collectors 77 through electrical connection via the conductive housing 73 and sealing portion 78. In one embodiment, one or both sealing caps 88a–b, may comprise a terminal 79 for effectuating external connection to the housing 73.

Figure 6:
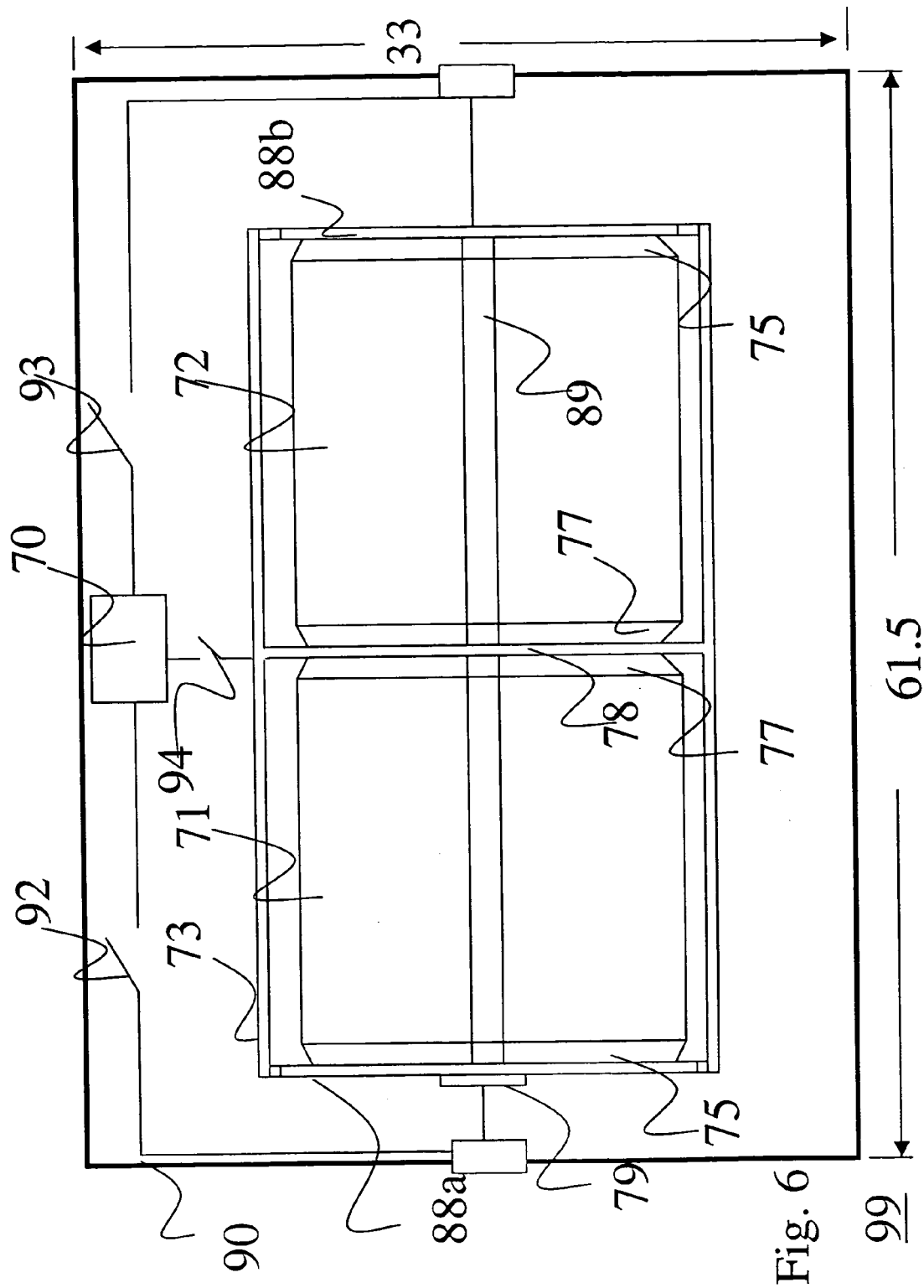
FIG. 6 illustrates an embodiment, wherein a sealed capacitor product is manufactured such that charge balancing circuit is shielded from unnecessary or unwanted end user interaction.

FIG. 6 illustrates an embodiment, wherein a sealed capacitor product 99 may be manufactured such that charge balancing circuit 70 is shielded from unnecessary or unwanted end user interaction. In embodiments wherein use of a charge balancing circuit 70 is provided for safety reasons, use of a preconnected charge balancing circuit 70 within an enclosure 90 would obviate the need for instructing end users as to proper connection and use of the charge balancing circuit. In one embodiment, the enclosure may therefore comprise a shrink wrap type plastic covering or other suitable material or suitable housing that may be used to shield the capacitor housing 73 and or circuit 70 from end user interaction. Use of an enclosure 90 could therefore facilitate use of housing 73 in an off the shelf pre-connected manner. However, in some applications wherein a charge balancing circuit 70 is provided, a charge balancing circuit may not be necessary. Thus, in one embodiment, one or more disconnect may be provided for selective enabling or disabling of the charge balancing circuit 70. In one embodiment, selective enabling or disabling could be provided by one or more connection, for example, one or more switch connection 92, 93, 94 (shown in an open condition) that permits selective on/off connections between the charge balancing circuit 70 and capacitor cells 71, 72.

FIG. 7a illustrates a side cross-sectional view of a capacitor housing used for holding two capacitor cells, and FIG. 7b illustrates in schematic form the electrical circuit formed thereby. It is identified that two or more capacitor cells connected in parallel may be operated at a higher capacitance than one capacitor cell alone. Accordingly, it is identified that one or more aspects of a double open-ended capacitor housing as described herein may be used to facilitate parallel connections of two capacitor cells and, thus, to provide such a parallel combination of cells for applications requiring higher capacitance than possible with one capacitor cell. Furthermore, it is identified that a double-open-ended housing could be provided in a battery form factor sized housing, for example, as a D cell form factor sized housing, with each capacitor cell within the housing sized appropriately to fit within the housing.

In one embodiment, a housing 173 comprises a centrally disposed inner sealing portion 178 comprised of conductive portion 178a and insulative portion 178b, wherein sealing portion 178b acts to electrically insulate the conductive portion 178a from the housing 173. Portion 178 effectuates a sealed inner separation of the housing 173, such that the housing can be used to separately or simultaneously house two capacitor cells 171, 172. In one embodiment, the housing 173 and the sealing portion 178*a* comprise a conductor or the like, for example, a metal such as aluminum. The housing 173 and portion 178 can be manufactured by one or more techniques known to those skilled in the art, for example, by molding, by extrusion, by deep draw, by physical insertion of the sealing portion, etc. In one embodiment, capacitor cells 171, 172 comprise double-layer capacitor cells configured as jellyrolls, wherein edges of collectors 175, 177 extend from ends of the capacitors. In one embodiment, the first capacitor cell 171 is disposed into one open end of the housing 173, and the second capacitor cell 172 is disposed into a second open end of the housing, such that the inward edges of collectors 177 extending from respective ends of the first and the second capacitor cells 171, 172 electrically contact a respective opposing side or surface of the conductive sealing portion 178*a* and, thus, each other. The collectors 177 may be subsequently electrically connected to sealing portion using one or more of the methods previously described herein. The housing 173 also includes two sealing caps 188*a*, to which the collectors 175 may also be electrically connected. The sealing caps 188*a*, 188*b* may be sealable coupled to the housing 173 such that an electrical connection is made between collectors 175 of capacitor cells 171 and 172. In one embodiment, the capacitor housing 173 also includes a conductive connection 170 to the conductive sealing portion 178*a*. Those skilled in the art will identify that an electrical connection could be made to connection 170 and to a terminal 179 in manner that the parallel capacitance of cells 171 and 172 could be utilized. In one embodiment, the conductive connection 170 is made through an insulated sealable hole made in an appropriate part of the housing 173. In one embodiment, it is envisioned that the connection 170 could be provided through a sealable fill hole used to impregnate one or both of the capacitor cells 171, 172 with electrolyte.

While the particular systems and methods herein shown and described in detail are fully capable of attaining the above described object of this invention, it is understood that the description and drawings presented herein represent some, but not all, embodiments of the invention and are therefore representative of the subject matter which is broadly contemplated by the present invention. For example other dimension, other form factors, other types of capacitors and other energy storage devices, for example battery cells, could be adapted and used with one or more embodiments disclosed herein. Thus, the present invention should accordingly limited by nothing other than the appended claims and their legal equivalents.

What is claimed is:

1. An energy storage device packaging system, comprising:
    a housing, the housing having a body and a separator, the body having a first opening and a second opening, the separator disposed within the housing, and the first and second opening separated by the separator;
    a first jellyroll type energy storage device cell disposed within the first opening and coupled to a first side of the separator; and
    a second jellyroll type energy storage device cell disposed within the second opening and coupled to a second side of the separator.

2. The packaging system of claim 1, wherein the first cell and the second cell are double-layer capacitors.

3. The packaging system of claim 1, wherein the first cell and the second cell each have a maximum operating voltage of about 4 volts.

4. The packaging system of claim 1, wherein the housing comprises a battery sized form factor.

5. The packaging system of claim 1, wherein the separator is in conductive contact with the housing.

6. The packaging system of claim 1, wherein the first and second cell are connected in series.

7. The packaging system of claim 6, wherein the cells and the housing are coupled to a balancing circuit.

8. The packaging system of claim 1, wherein the first and second cell are connected in parallel.

9. A double-layer capacitor product, comprising:
    a housing, the housing having a body and a separator, the body having a first opening and a second opening, the separator disposed within the housing, and the first and second opening separated by the separator;
    a first jellyroll type capacitor cell, disposed within the first opening and coupled to a first side of the separator; and
    a second jellyroll type capacitor cell disposed within the second opening and coupled to a second side of the separator.

10. The capacitor product of claim 9, wherein the product is rated to operate above 4 volts.

11. The capacitor product of claim 10, wherein the housing and the separator are in conductive contact.

* * * * *

UNITED STATES PATENT AND TRADEMARK OFFICE
CERTIFICATE OF CORRECTION

PATENT NO. : 6,952,338 B2
DATED : October 4, 2005
INVENTOR(S) : Gallay et al.

It is certified that error appears in the above-identified patent and that said Letters Patent is hereby corrected as shown below:

Title page,
Item [73], cancel "Assignees: Sony Corporation, Tokyo (JP); Sony Electronics Inc., Park Ridge, NJ (US)", and insert -- Assignees: Maxwell Technologies, Inc., San Diego, CA (US) --.

Signed and Sealed this

Third Day of January, 2006

JON W. DUDAS
*Director of the United States Patent and Trademark Office*